(12) United States Patent
Shin

(10) Patent No.: US 9,383,464 B2
(45) Date of Patent: Jul. 5, 2016

(54) SEISMIC IMAGING APPARATUS WITHOUT EDGE REFLECTIONS AND METHOD FOR THE SAME

(75) Inventor: Changsoo Shin, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 691 days.

(21) Appl. No.: 13/421,063

(22) Filed: Mar. 15, 2012

(65) Prior Publication Data

US 2012/0236686 A1 Sep. 20, 2012

Related U.S. Application Data

(60) Provisional application No. 61/454,204, filed on Mar. 18, 2011.

(30) Foreign Application Priority Data

Mar. 13, 2012 (KR) ........................ 10-2012-0025750

(51) Int. Cl.
*G01V 1/34* (2006.01)
*G01V 1/30* (2006.01)

(52) U.S. Cl.
CPC ........................ *G01V 1/30* (2013.01)

(58) Field of Classification Search
CPC ....................................................... G01V 1/30
USPC ............................................................ 367/73
See application file for complete search history.

(56) References Cited

U.S. PATENT DOCUMENTS

| 6,687,659 | B1 * | 2/2004 | Shen | ................................. | 703/2 |
| 2009/0006000 | A1 | 1/2009 | Shin | | |
| 2010/0042391 | A1 * | 2/2010 | Shin | ....................... | G01V 1/303 703/6 |
| 2010/0054082 | A1 * | 3/2010 | McGarry | .................. | G01V 1/28 367/53 |
| 2010/0118651 | A1 * | 5/2010 | Liu | ......................... | G01V 1/282 367/50 |
| 2010/0322032 | A1 | 12/2010 | Shin | | |
| 2011/0066404 | A1 | 3/2011 | Salazar-Tio et al. | | |
| 2011/0082645 | A1 * | 4/2011 | Stefani | .................... | G01V 99/00 702/14 |

FOREIGN PATENT DOCUMENTS

| KR | 10-2010-0029214 A | 6/2010 |
| KR | 10-2010-135602 A | 12/2010 |
| KR | 10-1092668 B1 | 12/2011 |
| WO | WO 03/023447 A2 | 3/2003 |

* cited by examiner

*Primary Examiner* — Daniel L Murphy

(57) ABSTRACT

A seismic imaging technology for imaging a subsurface structure is provided. The seismic imaging technology is applied to modeling parameters of a wave equation redefined in a new coordinate system resulting from converting space axes into a logarithmic scale. The redefined wave equation is applied to wave inversion or reverse-time migration.

10 Claims, 3 Drawing Sheets

SEISMIC IMAGING APPARATUS WITHOUT EDGE REFLECTIONS AND METHOD FOR THE SAME

CROSS-REFERENCE TO RELATED APPLICATION

This application claims priority under 35 U.S.C. §119(e) of U.S. Patent Application No. 61/454,204, filed on Mar. 18, 2011, and under 35 U.S.C. §119(a) of Korean Patent Application No. 10-2012-0025750 filed on Mar. 13, 2012, in the Korean Intellectual Property Office. The entire disclosures of the earlier filed applications are incorporated herein by reference for all purposes.

BACKGROUND

1. Field

The following description relates to a seismic imaging technology for imaging a subsurface structure by processing measured data reflected from the subsurface structure after a wave from a source wave has been propagated to the subsurface structure.

2. Description of the Related Art

Technologies for imaging a subsurface structure through waveform inversion have been studied and developed. An example of such technologies is disclosed in a Korean Patent Registration No. 1,092,668 registered on 5 Dec. 2011, filed on 17 Jun. 2009 with the Korea Intellectual Property Office. The Korean Patent Registration has been filed as U.S. patent application Ser. No. 12/817,799 with the U.S. Patent and Trademark Office.

According to the disclosures, a low-frequency signal from a source is sent to a subsurface structure, a wave reflected from the subsurface structure is measured as measured data by a receiver such as a hydrophone array, and then the measured data is used to obtain a modeling parameter of the corresponding subsurface structure. The coefficients of a wave equation consist of modeling parameters such as the density, etc. of the subsurface space to which the wave is propagated. The modeling parameters of the wave equation are calculated by waveform inversion. According to the waveform inversion, the modeling parameters are calculated while being continuously updated in the direction of minimizing a residual function regarding the difference between modeling data and measured data, wherein the modeling data is a solution of the wave equation.

SUMMARY

The following description relates to a wave-propagation modeling method that redefines space axes in the wave equation. In the redefined space axes using a logarithmic function, wavefront does not reach artificial boundaries. This method can be used to eliminate artificial boundaries. Computational overburden is minimized in the redefined wave equation.

In one general aspect, a modeling parameter of a wave equation redefined in a new coordinate system resulting from converting space axes into a logarithmic scale is obtained. There is provided a seismic imaging apparatus including: a waveform inversion unit configured to obtain the modeling parameter of the wave equation, while continuously updating the modeling parameter in the direction of minimizing a residual function regarding an error between modeling data and measured data, wherein the modeling data is a solution of the wave equation to which the modeling parameter has been applied and the measured data has been measured by a receiver; and a subsurface structure display unit configured to image a subsurface structure from the modeling parameter.

According to another aspect, the waveform inversion unit may include: a modeling data calculator configured to solve the wave equation redefined in the new coordinate system with given source data, thereby obtaining a solution of the wave equation as the modeling data; a residual function calculator configured to obtain a residual function regarding a residual between the measured data and the modeling data; and a modeling parameter calculator configured to update, if a value of the residual function is greater than a predetermined value, the modeling parameter of the wave equation in the direction of minimizing the residual function and supply the updated modeling parameter to the modeling data calculator, and to output, if the value of the residual function is smaller than the predetermined value, the modeling parameter as a final output value.

According to another aspect, the subsurface structure display unit may include: a migration unit configured to perform reverse-time migration to generate a real subsurface image from modeling parameters output from the waveform inversion unit; and a display data generator configured to generate visual subsurface image data from the reverse-time migrated data output from the migration unit.

According to another aspect, the migration unit may include: a back-propagation unit configured to back-propagate the measured data with respect to the wave equation redefined in the new coordinate system; and a convolution unit configured to convolve the back-propagated, measured data with source data, thereby outputting reverse-time migrated data.

Therefore, by eliminating artificial edge reflections, computational overburden can be minimized while acquiring a clear subsurface image.

Other features and aspects will be apparent from the following detailed description, the drawings, and the claims.

Figure 1:
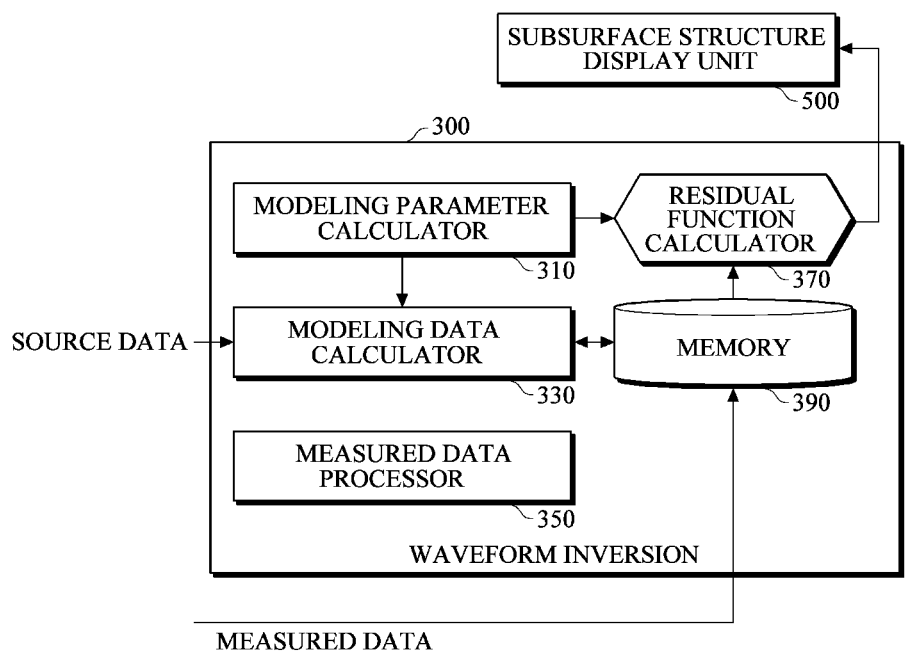
FIG. 1 is a diagram illustrating an example of a seismic imaging apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Numerical methods such as a finite difference method, a finite element method, a spectral element method, etc. are widely used to simulate the wave propagation. Since a numerical modeling in a domain contains artificial boundaries, edge reflections from those boundaries serve as barriers in an accurate simulation of natural phenomena. It is a good solution to construct a domain large enough so that the wavefront never reaches the artificial boundary. However, limited computational resources prohibit the solution. In order to solve this problem, there have been suggested many kinds of boundary conditions; absorbing boundary conditions disclosed in "Absorbing Boundary Conditions for Acoustic and Elastic Wave Equations" and "Bulletin of the Seismological Society of America, 67, 1529-1540" (Clayton, R., and Engquist, B, 1977), sponge boundary condition disclosed in "Sponge Boundary Condition for Frequency-Domain Modeling, Geophysics, 60(6), 1870-1874" (Shin, C., 1995); and PML (Perfectly Matched Layers) boundary condition (Berenger, 1994). However, these boundary conditions cannot eliminate all edge reflections perfectly.

In the current example, a wave equation with new space axes is redefined. The characteristic of the new wave equation depends on the selection of those axes. If a logarithmic function is applied to an axis, the wave propagates along the logarithmic axis. Then, a very large modeling domain can be used which makes the wavefront does not reach the boundary during total recording time, without computational overburden.

A 1-D wave equation can be expressed as $$\frac{1}{c^2}\frac{\partial^2 u(x,t)}{\partial t^2} = \frac{\partial^2 u(x,t)}{\partial x^2} + f(x_0, t), \quad (1)$$

where c is the velocity, u(x, t) is the wavefield, $f(x_0,t)$ is the source wavelet, and x, t, $x_0$ are the space variable, time variable, and source point, respectively. If it is assumed that the wave propagates along the new axis X (X=f(x)), the wave equation can be redefined as follow $$\frac{1}{c^2}\frac{\partial^2 u(X,t)}{\partial t^2} = \frac{\partial^2 u(X,t)}{\partial x^2} + f(X_0, t), \quad (2)$$

In this equation, the second derivative with respect to x can be rearranged with the new axis X as follows $$\frac{\partial u(X,t)}{\partial x} = \frac{\partial u(X,t)}{\partial X}\frac{\partial X}{\partial x}, \quad (3)$$

$$\frac{\partial}{\partial x}\left(\frac{\partial u(X,t)}{\partial x}\right) = \frac{\partial}{\partial x}\left(\frac{\partial u(X,t)}{\partial X}\frac{\partial X}{\partial x}\right) \quad (4)$$

$$= \frac{\partial^2 u(X,t)}{\partial X^2}\left(\frac{\partial X}{\partial x}\right)^2 + \frac{\partial u(X,t)}{\partial X}\frac{\partial^2 X}{\partial x^2}$$

Then, the redefined wave equation can be expressed as $$\frac{1}{c^2}\frac{\partial^2 u(X,t)}{\partial t^2} = \frac{\partial^2 u(X,t)}{\partial X^2}\left(\frac{\partial X}{\partial x}\right)^2 + \frac{\partial u(X,t)}{\partial X}\frac{\partial^2 X}{\partial x^2} + f(X_0, t) \quad (5)$$

The wave equation may have different characteristics according to a selection of the new axis X. In addition, the redefined wave equation can be extended to 2-D and 3-D without any difficulty even to the first order wave equation such as a staggered grid method disclosed in detail in the paper "P-SV Wave Propagation in Heterogeneous Media: Velocity-Stress Finite-Difference Method: Geophysics, 51, 889-901" (Virieux, J., 1986).

FIG. 1 is a diagram illustrating an example of a seismic imaging apparatus. The seismic imaging apparatus obtains a modeling parameter of a wave equation redefined in a new coordinate system resulting from converting space axes into a logarithmic scale. Referring to FIG. 1, the seismic imaging apparatus includes a waveform inversion unit 300 and a subsurface structure display unit 500. The waveform inversion unit 300 obtains the modeling parameter while continuously updating the modeling parameter in the direction of minimizing a residual function regarding an error between modeling data and measured data, wherein the modeling data is a solution of the wave equation to which the modeling parameter has been applied and the measured data has been measured by a receiver. The subsurface structure display unit 500 images the corresponding subsurface structure from the obtained modeling parameter.

The individual blocks shown in FIG. 1 may be implemented as computer program codes. The blocks may represent functions implemented as program codes, and the meanings and implementation methods of the blocks will be obvious to those skilled in the art. Likewise, as will be easily understood by those skilled in the art, it is apparent that the individual blocks are only functionally distinguished and may be combined or mixed with each other in representation as program codes.

If the logarithmic function is used as a new axis, the wave propagates along the logarithmic axis. Then, a large modeling domain can be constructed without computational overburden. New axes for 2-D are as follows, $$X = \begin{cases} \log(x+1) & x \geq 0 \\ -\log(-x+1) & x \leq 0 \end{cases} \quad (6)$$

$$Z = \log(z+1), \quad z \geq 0.$$

Then, the new 2-D wave equation can be expressed as $$\frac{1}{c^2}\frac{\partial^2 u(X,Z,t)}{\partial t^2} = \frac{\partial^2 u(X,Z,t)}{\partial X^2}\frac{1}{e^{2X}} - \frac{\partial u(X,Z,t)}{\partial X}\frac{1}{e^{2X}} + \quad (7)$$

$$\frac{\partial^2 u(X,Z,t)}{\partial Z^2}\frac{1}{e^{2Z}} - \frac{\partial u(X,Z,t)}{\partial Z}\frac{1}{e^{2Z}} + f(X_0, Z_0, t), X \geq 0.$$

A method of obtaining a space parameter for minimizing a residual by waveform inversion from the wave equation is disclosed in the prior application filed by the same applicant. Modeling parameters are updated in the direction of minimizing a residual function regarding an error between modeling data and measured data, wherein the modeling data is a solution of the wave equation to which the modeling parameters have been applied and the measured data has been measured by a receiver. When the magnitude of the residual function converges to a predetermined value or less, modeling parameter values at that time are output as structural data of the space.

The subsurface structure display unit 500 images a subsurface structure from the modeling parameter obtained by the waveform inversion unit 300. According to another aspect, the subsurface structure display unit 500 may generate and output a color image of the corresponding subsurface structure from the modeling parameter. That is, the subsurface structure display unit 500 may map location-based velocity or density values to different colors to thereby output a color image.

According to another aspect, the waveform inversion unit 300 may include a modeling data calculator 330, a residual function calculator 370, and a modeling parameter calculator 310. The modeling data calculator 330 solves a wave equation redefined in a new coordinate system resulting from converting space axes into a logarithmic scale, with given source information, to thereby obtain a solution of the wave equation as modeling data. The residual function calculator 370 obtains a residual function regarding a residual between the modeling data and measured data. The modeling parameter calculator 310 updates, if the value of the residual function is greater than a predetermined value, the modeling parameter of the wave equation in the direction of minimizing the residual function and supplies the updated modeling parameter to the modeling data calculator 330, and outputs, if the value of the residual function is smaller than the predetermined value, the modeling parameter as a final output value.

The modeling parameter calculator 310 stores initial parameter values about an initial model of the subsurface structure. The initial parameter values may be arbitrarily set. The modeling data calculator 330 calculates modeling data that can be detected from individual receiving points when waves generated from the equivalent sources are propagated to a subsurface structure defined by the updated modeling parameters. The modeling data may be obtained by solving a wave equation specified by modeling parameters using a numerical analysis method such as a finite difference method or finite element method.

The residual function calculator 370 calculates an error between the measured data stored in a memory 390 and the modeling data calculated from an arbitrary initial model. The residual function may be selected to a L2 norm, a logarithmic norm, a pth power, and an integral value, etc. When the error is greater than a predetermined value, the modeling parameter calculator 310 may update the modeling parameter in the direction of reducing the error. The process is performed by calculating a gradient of a residual function with respect to each model parameter to obtain modeling parameters for minimizing the residual function. When the error is greater than a predetermined value, the modeling parameter is continuously updated, and when the error is smaller than the predetermined value, the corresponding modeling parameter is determined to a final modeling parameter for the subsurface structure and output. The modeling parameter corresponds to a coefficient of a wave equation, and may be a velocity, density, etc. of the corresponding subsurface space.

Figure 2:
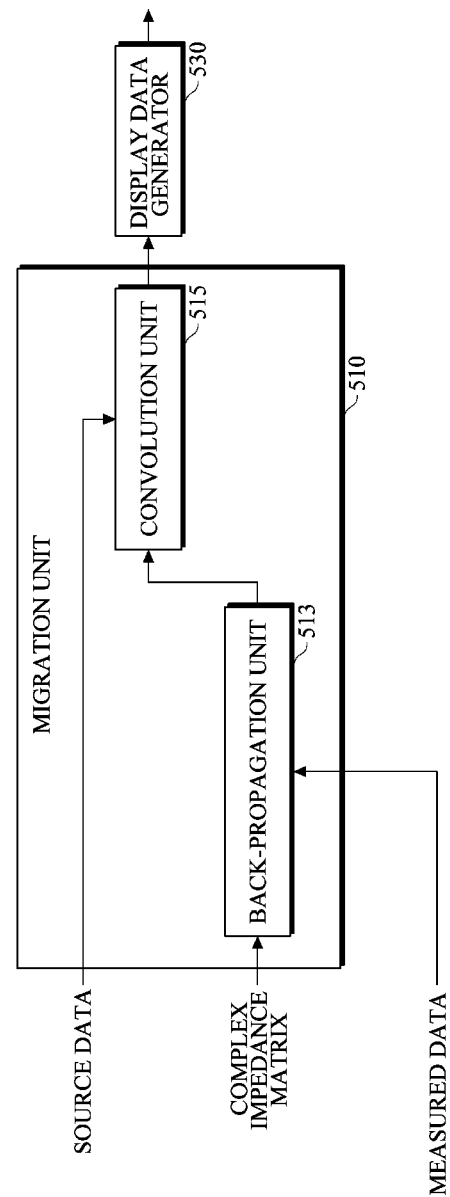
FIG. 2 is a diagram illustrating an example of a reverse-time migration apparatus.

FIG. 2 is a diagram illustrating an example of a reverse-time migration apparatus. According to another independent aspect, the subsurface structure display unit 500 includes a migration unit 510 and a display data generator 530. The migration unit 510 performs reverse-time migration to generate a real subsurface image from modeling parameters output from the waveform inversion unit 300. The display data generator 530 generates visual subsurface image data from the reverse-time migrated data output from the waveform inversion unit 300. An example of such waveform inversion is disclosed in detail in U.S. patent application Ser. No. 13/165,185 invented and filed by the same inventor. The display data generator 530 maps location-based velocity or density values to different colors to thereby output a color image.

The individual blocks shown in FIG. 2 may be implemented as computer program codes. The blocks may represent functions implemented as program codes, and the meanings and implementation methods of the blocks will be obvious to those skilled in the art. Likewise, as will be easily understood by those skilled in the art, it is apparent that the individual blocks are only functionally distinguished and may be combined or mixed with each other in representation as program codes.

According to another aspect, the migration unit 510 includes a back-propagation unit 513 and a convolution unit 515. The back-propagation unit 513 back-propagates measured data with respect to a wave equation redefined in a new coordinate system resulting from converting space axes into a logarithmic scale. The convolution unit 515 convolves the back-propagated measured data with source data to thereby output reverse-time migration data. In this specification, the case of applying a technique for reverse-time, back-propagating measured data with respect to a wave equation resulting from converting space axes into a logarithmic scale to thereby image a subsurface structure, together with waveform inversion described above, has been described, however, reverse-time, back-propagation may be applied independently from waveform inversion. The invention includes both the cases. Details about reverse-time migration have been described in the prior application, and accordingly detailed descriptions therefor will be omitted.

The invention as described above relates to an apparatus invention, however, the invention may be implemented as program codes so that it can be expressed as a method invention. According to an aspect, there may be provided a seismic imaging method including: obtaining a modeling parameter of a wave equation redefined in a new coordinate system resulting from converting space axes into a logarithmic scale, while continuously updating the modeling parameter in the direction of minimizing a residual function regarding an error between modeling data and measured data, wherein the modeling data is a solution of the wave equation to which the modeling parameter has been applied and the measured data has been measured by a receiver; and imaging a subsurface structure from the modeling parameter.

The obtaining of the modeling parameter may include: solving the wave equation redefined in the new coordinate system with given source data to obtain a solution of the wave equation as the modeling data; obtaining a residual function regarding a residual between the measured data and the modeling data; and updating, if a value of the residual function is greater than a predetermined value, the modeling parameter of the wave equation in the direction of minimizing the residual function, and outputting, if the value of the residual function is smaller than the predetermined value, the modeling parameter as a final output value The imaging of the subsurface structure may include: performing reverse-time migration to generate a real subsurface image from modeling parameters output upon the obtaining of the modeling parameter; and generating visual subsurface image data from the reverse-time migrated data.

The migration may include: back-propagating the measured data with respect to the wave equation redefined in the new coordinate system; and convolving the back-propagated, measured data with source data to output the reverse-time migrated data.

Figure 3:
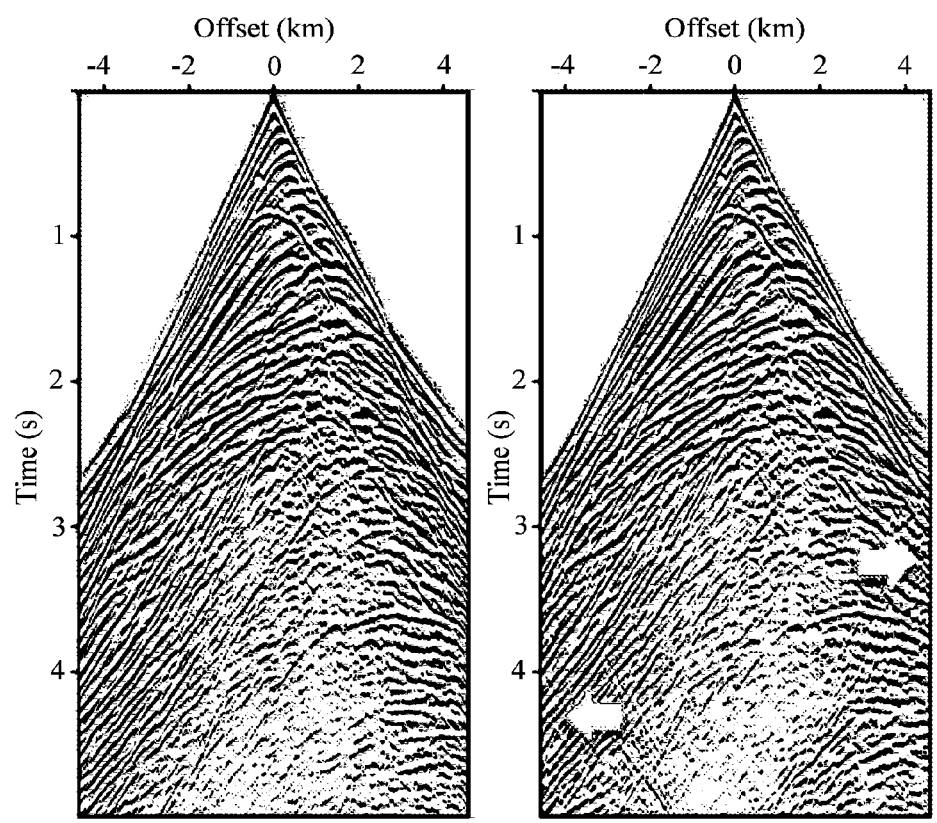
FIG. 3 shows subsurface images, wherein the right image of FIG. 3 is a subsurface image obtained by solving a conventional wave equation with an absorbing boundary condition using Marmousi velocity model, and the left image of FIG. 3 is a subsurface image obtained by solving the wave equation with new logarithmic function axes using a finite difference method.

The right image of FIG. 3 is an estimated subsurface image obtained by solving a conventional wave equation with an absorbing boundary condition disclosed in the paper "Boundary Conditions for Numerical Solution of Wave Propagation Problems, Geophysics, 43(6), 1099-1110", using Marmousi velocity model disclosed in the paper "Sensitivity of Prestack Depth Migration to the Velocity Model, Geophysics, 58, 873-882 (Versteeg, R., 1993)". In this simulation, the velocity model is 9.2 km wide and 3 km deep and has 4-m grid interval. Source wavelet was the first-derivative Gaussian function with the maximum frequency of 30 Hz. Total recording time was 5 s.

The left image of FIG. 3 shows a subsurface image obtained by solving the wave equation with new logarithmic function axes using a finite difference method. A large modeling domain with 40 km width and 20 km depth was constructed. Although the domain is large, only 1217×609 node points are used. And, other conditions are the same as a conventional test. As seen in FIG. 3, the right image shows edge reflections in parts denoted by arrows, while in the left image, wavefront does not reach artificial boundaries during the recording time and accordingly there is no edge reflection.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A seismic imaging apparatus comprising:
   a processor;
   a waveform inverter implemented by the processor and configured to obtain a modeling parameter of a wave equation redefined in a new coordinate system as a result of converting space axes into a logarithmic scale;
   a modeling parameter updater implemented by the processor and configured to minimize a residual function of an error between modeling data and measured data, wherein the modeling data is a solution of the wave equation to which the modeling parameter has been applied and the measured data has been measured by a receiver; and
   a subsurface structure display configured to display an image of a subsurface structure based on the modeling parameter.

2. The seismic imaging apparatus of claim 1, wherein the waveform inverter comprises:
   a modeling data calculator configured to solve the wave equation redefined in the new coordinate system with given source data, thereby obtaining a solution of the wave equation as the modeling data;
   a residual function calculator configured to obtain a residual function of a residual between the measured data and the modeling data; and
   a modeling parameter calculator configured to update the modeling parameter of the wave equation to minimize the residual function and supply the updated modeling parameter to the modeling data calculator, in response to a value of the residual function being greater than a predetermined value, and to output the modeling parameter as a final output value, in response to the value of the residual function being smaller than the predetermined value.

3. The seismic imaging apparatus of claim 1, wherein the subsurface structure display unit comprises:
   a migrator configured to perform reverse-time migration to generate a real subsurface image based on modeling parameters output from the waveform inverter; and
   a display data generator configured to generate visual subsurface image data from the reverse-time migrated data output from the migrator.

4. The seismic imaging apparatus of claim 3, wherein the migrator comprises:
   a back-propagator configured to back-propagate the measured data with respect to the wave equation redefined in the new coordinate system; and
   a convolutor configured to convolve the back-propagated, measured data with source data, thereby outputting reverse-time migrated data.

5. A seismic imaging method performed by a seismic imaging apparatus, comprising:
   obtaining, at a waveform inverter implemented by a processor, a modeling parameter of a wave equation redefined in a new coordinate system as a result of converting space axes into a logarithmic scale;
   updating, using the processor, the modeling parameter to minimize a residual function of an error between modeling data and measured data, wherein the modeling data is a solution of the wave equation to which the modeling parameter has been applied and the measured data has been measured by a receiver; and
   imaging a subsurface structure based on the modeling parameter.

6. The seismic imaging method of claim 5, wherein the obtaining of the modeling parameter comprises:
   solving the wave equation redefined in the new coordinate system with given source data to obtain a solution of the wave equation as the modeling data;
   obtaining a residual function regarding a residual between the measured data and the modeling data; and
   updating the modeling parameter of the wave equation in the direction of minimizing the residual function, in response to a value of the residual function being greater than a predetermined value, and outputting the modeling parameter as a final output value, in response to the value of the residual function being smaller than the predetermined value.

7. The seismic imaging method of claim 5, wherein the imaging of the subsurface structure comprises:
   performing reverse-time migration to generate a real subsurface image based on modeling parameters output upon the obtaining of the modeling parameter; and
   generating visual subsurface image data based on the reverse-time migrated data.

8. The seismic imaging method of claim 7, wherein the migration comprises:
   back-propagating the measured data with respect to the wave equation redefined in the new coordinate system; and
   convolving the back-propagated, measured data with source data to output the reverse-time migrated data.

9. A computer-readable non-transitory recording medium storing a computer-readable program for executing the method of claim 8.

10. A computer-readable non-transitory recording medium storing a computer-readable program for executing the method of claim 5.

* * * * *